United States Patent Office 2,957,019
Patented Oct. 18, 1960

2,957,019
O,O-DIALKYL S-(2-CYANO-HALOALKYL) PHOSPHOROTHIOLOTHIONATES

Marvin A. McCall, Harry W. Coover, Jr., and Richard L. McConnell, Kingsport, Tenn., assignors to Eastman Kodak Company, Rochester, N.Y., a corporation of New Jersey No Drawing. Filed Feb. 14, 1958, Ser. No. 715,204

6 Claims. (Cl. 260—461)

This invention relates to new organophosphorus compounds and to their method of preparation. In a specific aspect this invention relates to the preparation of new organophosphorus compounds by the reaction of dialkyl phosphorothiolothionates with certain α-substituted acrylonitrile derivatives and to the products of this process.

Organophosphorus compounds have evidenced marked utility and importance in many fields. For example, they have been employed as insecticides, fungicides, pesticides and in related uses. Consequently, it is of considerable importance to discover new and useful organophosphorus compounds and to have a new process for the production of organophosphorus compounds. Therefore, it is an object of this invention to provide new and useful organophosphorus compounds. It is another object of this invention to provide a novel method for preparing the new and useful organophosphorus compounds. It is still another object of this invention to provide new and valuable insecticides that can be used in various insecticidal compositions.

Among the known organophosphorus compounds are compounds such as the cyanoethyl and chloroethyl esters of diethyl dithiophosphoric acid, but, when these compounds have been used as insecticides, it has in the past been considered necessary to use these compounds in concentrations of about 5% by weight of the insecticidal compositions. Our compounds, on the other hand, are quite effective as insecticides at concentrations as low as 30 p.p.m. and in some instances at 10 p.p.m. It is therefore another object of this invention to provide new insecticides that can be used at unexpectedly low concentrations.

In accordance with this invention it has been found that new organophosphorus compounds, useful as insecticides, can be prepared by reacting, for example, dialkyl phosphorothiolothionates with certain α-substituted acrylonitrile derivatives. The new products of this invention have the structural formula:

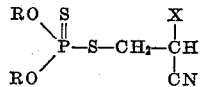

wherein R is selected from the group consisting of lower alkyl, containing 1 to 4 carbon atoms, and lower haloalkyl (chloromethyl, dibromoethyl, trichloropropyl, and the like) containing 1 to 4 carbon atoms and X is selected from the group consisting of halogen and halomethyl.

In preparing the products of this invention, dialkyl phosphorothiolothionates having the following structural formula are used:

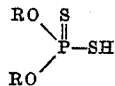

wherein R is as defined above. The α-substituted acrylonitriles that are used in preparing the compounds of this invention have the structural formula:

wherein X is as defined above in the structural formula for the products of this invention.

In the practice of this invention we prefer to add one of the reactants gradually to a reactor containing the other reactant. For example, we prefer to add the acrylonitrile derivatives gradually to a reactor containing the dialkylphosphorothiolothionate. Alternatively however, the reverse procedure of addition of reactants can be used and the dialkylphosphorothiolothionate can be added to a reactor containing the acrylonitrile derivative. Normally it is desirable to employ a reactor provided with adequate means of agitation and, since the reaction is quite exothermic, it is also desirable to employ a reactor that is provided with adequate cooling means.

The operable temperature range for the reaction is generally from −25 to 150° C. and the preferred temperature range is from 25 to 100° C. However, it will be realized that in some instances temperatures outside this range can be employed. The reaction time usually varies from 0.5 to 8 hours, but longer and shorter reaction periods are sometimes used. Normally it is unnecessary to employ a catalyst for the reaction, but if it is considered desirable to employ a catalyst, there are certain catalyst that can be used, for example, the tertiary amines, such as triethylamine and the like.

Ordinarily, it is not necessary to employ a solvent for the reaction but in some instances solvents are desirable. Among the solvents that can be used are normally liquid aliphatic and aromatic hydrocarbons such as pentane, heptane, octane, benzene, toluene, the xylenes and the like, chlorinated derivatives of the above-mentioned hydrocarbons as well as the common ether and ester solvents. It is preferable to carry out the reaction using equimolar quantities of the reactants. However, it is within the scope of our invention to use any molar ratio of reactants.

The dialkyl and substituted dialkyl phosphorothiolothionates that are used in our invention can be prepared by the reaction of 4 moles of the appropriate alcohol with one mole of phosphorus pentasulfide. The acrylonitrile derivatives can be prepared by several methods. For example, the fluoromethylacrylonitriles can be prepared by treating fluoroacetone cyanohydrin compounds with thionyl chloride or by pyrolysis of such cyanohydrins, or by preparing the α-acyloxy derivative of such cyanohydrins and pyrolyzing this derivative at 150 to 600° C.

The following examples are illustrative of the compounds within the scope of this invention, their method of preparation and their utility as insecticides.

*Example 1.—O,O-diethyl-S-(2-chloro-2-cyanoethyl) phosphorothiolothionate*

Diethyl phosphorothiolothionate (0.1 mole) and α-chloroacrylonitrile (0.1 mole) were mixed with stirring. Then three drops of triethylamine were added and the temperature of the reaction mixtures gradually rose to a maximum of 50° C. When the reaction temperature had dropped to 25° C., the reaction mixture was heated on the steam bath with stirring for 15 minutes. The product is an orange oil, $n_D^{20}$ 1.5198. The following quantitative analyses were obtained on the product: chlorine 12.06%, nitrogen 4.69%.

*Example 2.—O,O-diethyl-S-(2-bromo-2-cyanoethyl) phosphorothiolothionate*

$(C_2H_5O)_2P(S)SCH_2CH(Br)CN$

This compound was prepared from diethyl phosphorothiolothionate (0.1 mole), α-bromoacrylonitrile (0.1 mole), and a catalytic amount of tributylamine according to the procedure of Example 1.

*Example 3.—O,O-diethyl-S-(2-cyano-2-fluoroethyl) phosphorothiolothionate*

$(C_2H_5O)_2P(S)SCH_2CH(F)CN$

This compound was prepared from diethyl phosphorothiolothionate (0.2 mole), α-fluoroacrylonitrile (0.2 mole) and a catalytic amount of triethylamine according to the procedure of Example 1.

*Example 4.—O,O-dimethyl-S-(2-chloro-2-cyanoethyl) phosphorothiolothionate*

$(CH_3O)_2P(S)SCH_2CH(Cl)CN$

This compound was prepared from dimethyl phosphorothiolothionate (0.1 mole), α-chloroacrylonitrile (0.1 mole), and a catalytic amount of trimethylamine according to the procedure of Example 1.

*Example 5.—O,O-diisopropyl-S-(2-bromo-2-cyanoethyl) phosphorothiolothionate*

$[(CH_3)_2CHO]_2P(S)SCH_2CH{-}(Br)CN$

This compound was prepared from diisopropyl phosphorothiolothionate (0.1 mole), α-bromoacrylonitrile (0.1 mole) and a catalytic amount of triethylamine according to the procedure of Example 1.

*Example 6.—O,O-diethyl S-(2-cyano-3,3,3-trifluoropropyl) phosphorothiolothionate*

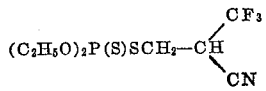

This compound was prepared by the dropwise addition of α-trifluoromethylacrylonitrile (0.1 mole) to O,O-diethyl phosphorothiolothionate (0.1 mole) with stirring. The reaction was exothermic and the temperature of the reaction mixture was kept below 65–70° C. by controlling the rate of addition. The reaction was completed by heating the mixture for 15 minutes on a steam bath and then vacuum stripping to remove any volatile impurities. The product was a dark oil, $n_D^{20}$ 1.4779.

*Example 7.—O,O-diethyl S-(2-cyano-3,3-difluoropropyl) phosphorothiolothionate*

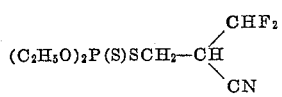

This compound was prepared by the dropwise addition of α-difluoromethylacrylonitrile (0.1 mole) to O,O-diethyl phosphorothiolothionate (0.1 mole) in a manner similar to that described in Example 6.

*Example 8.—O-ethyl, O-propyl S-(2-cyano-3-bromopropyl) phosphorothiolothionate*

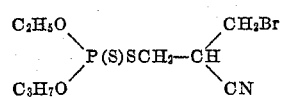

This compound was prepared by the addition of α-bromomethylacrylonitrile (0.1 mole) to O-ethyl, O-propyl phosphorothiolothionate (0.1 mole) by the same procedure described in Example 6.

*Example 9.—O,O-bis(2,2,2-trichloroethyl) S-(2-cyano-3-chloropropyl) phosphorothiolothionate*

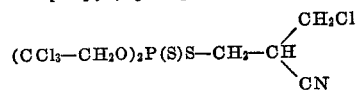

This compound was prepared from O,O-bis(2,2,2-trichloroethyl) phosphorothiolothionate (0.1 mole) and α-chloromethylacrylonitrile (0.1 mole) by the same procedure as described in Example 6.

*Example 10.—O,O-dimethyl S-(2-cyano-3,3-dichloropropyl) phosphorothiolothionate*

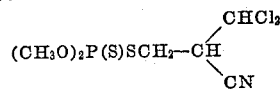

This compound was prepared from O,O-dimethyl phosphorothiolothionate (0.1 mole) and α-dichloromethylacrylonitrile (0.1 mole) by the same procedure as used in Example 6.

*Example 11*

Tests against aphids were carried out in the following manner. Acetone solutions containing 1% of the candidate compounds were prepared and diluted with water to give solutions of the desired concentration for testing. Two heavily infested bean leaves containing adult cowpea aphids (*Aphis medicaginis* Koch) carefully dipped in the above solutions and dried in a gentle air stream. The leaves were then placed on damp paper toweling in Petri dishes and observed after 24 hours for mortality among adult aphids. It should be noted that tests using acetone-water solutions (containing none of the toxicant) kill none of the aphids.

| Toxicant | Concentration of Toxicant in p.p.m. | Percent Kill of Aphids |
|---|---|---|
| 1. O,O-Diethyl S-(2-Cyano-3,3,3-trifluoropropyl) phosphorothiolothionate. | 100<br>30<br>10 | 100<br>90<br>85 |
| 2. O,O-Diethyl S-(2-Cyano-3,3-difluoropropyl) phosphorothiolothionate. | 100<br>30<br>10 | 100<br>89<br>80 |
| 3. O,O-Dimethyl S-(2-Cyano-3,3-dichloropropyl) phosphorothiolothionate. | 100<br>30<br>10 | 100<br>88<br>83 |

The compounds of Examples 9 and 10 were similarly effective when used in the above tests.

*Example 12*

Tests against mites were carried out in the following manner. Acetone solutions containing 1% of the candidate compounds were prepared and diluted with water to give solutions of the desired concentration for testing. Two heavily infested bean leaves containing adult two-spotted mites (*Tetranychus bimaculatus* Harvey) were carefully dipped in the above solutions and dried in a gentle air stream. The leaves were then placed on damp paper toweling in Petri dishes and observed after 24 hours for mortality among the adult mites.

It should be noted that tests using acetone-water solutions (containing none of the toxicant) kill none of the mites.

| Toxicant | Concentration of Toxicant in p.p.m. | Percent Kill of Mites |
|---|---|---|
| 1. O,O-Diethyl-S-(2-chloro-2-cyanoethyl Phosphorothiolothionate. | 100<br>30 | 100<br>73 |

The compounds illustrated by Examples 2 through 5 were similarly effective when tested in the above manner.

We claim:
1. The organophosphorus compositions having the structural formula:

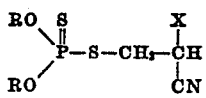

wherein R is selected from the group consisting of lower alkyl and lower haloalkyl and X is selected from the group consisting of halogen and halomethyl.

2. The organophosphorus composition having the structural formula:

$$(C_2H_5O)_2P(S)SCH_2CH(Cl)CN$$

3. The organophosphorus composition having the structural formula:

$$(CH_3O)_2P(S)SCH_2CH(Cl)CN$$

4. The organophosphorus composition having the structural formula:

$$[(CH_3)_2CHO]_2P(S)SCH_2CH(Br)CN$$

5. The organophosphorus composition having the structural formula:

6. The organophosphorus composition having the structural formula:

References Cited in the file of this patent
UNITED STATES PATENTS

| | | |
|---|---|---|
| 2,494,283 | Cassaday et al. | Jan. 10, 1950 |
| 2,494,284 | Cassaday et al. | Jan. 10, 1950 |
| 2,578,652 | Cassaday | Dec. 18, 1951 |
| 2,611,728 | Bartlett et al. | Sept. 23, 1952 |

OTHER REFERENCES

Mel'nikov et al.: Chem. Abst., 48, 556–7 (1954).
Gar et al.: Chem. Abst., 48, 6639–40 (1954).